(12) United States Patent
Tomita et al.

(10) Patent No.: US 7,897,229 B2
(45) Date of Patent: *Mar. 1, 2011

(54) RELEASE SHEET AND PRESSURE-SENSITIVE ADHESIVE ARTICLE

(75) Inventors: Daisuke Tomita, Saitama (JP); Yasushi Sasaki, Tokushima (JP); Takuo Nishida, Saitama (JP)

(73) Assignee: Lintec Corporation (JP)

(*) Notice: Subject to any disclaimer, the term of this patent is extended or adjusted under 35 U.S.C. 154(b) by 1042 days.

This patent is subject to a terminal disclaimer.

(21) Appl. No.: 11/385,421

(22) Filed: Mar. 21, 2006

(65) Prior Publication Data

US 2006/0216452 A1 Sep. 28, 2006

(30) Foreign Application Priority Data

Mar. 22, 2005 (JP) .................... 2005-081745
Jan. 20, 2006 (JP) .................... 2006-012373

(51) Int. Cl.
B32B 9/00 (2006.01)
B32B 33/00 (2006.01)
(52) U.S. Cl. .................... 428/41.8; 428/40.1
(58) Field of Classification Search .......... 428/40.1, 428/41.8

See application file for complete search history.

(56) References Cited

U.S. PATENT DOCUMENTS

| 2,647,843 | A | * | 8/1953 | Bemmels | 428/351 |
| 2,987,420 | A | * | 6/1961 | Bemmels et al. | 428/355 AK |
| 2004/0071919 | A1 | | 4/2004 | Sakurai et al. | |

FOREIGN PATENT DOCUMENTS

CN 1495241 A 5/2004

OTHER PUBLICATIONS

Office Action for Chinese Application No. 200610068118.3, dated Sep. 4, 2009, 7 pages.

* cited by examiner

*Primary Examiner* — Victor S Chang
(74) *Attorney, Agent, or Firm* — Brinks Hofer Gilson & Lione; G. Peter Nichols (57) ABSTRACT

A pressure-sensitive adhesive article 100 includes a release sheet 1 constituted from a releasing agent layer 11 and a base material 12, and a pressure-sensitive adhesive sheet 2 constituted from a pressure-sensitive adhesive layer 21 and a pressure-sensitive adhesive sheet base 22. Such a pressure-sensitive adhesive article 100 has a structure in which the pressure-sensitive adhesive sheet 2 is laminated on the release sheet 1 so that the pressure-sensitive adhesive layer 21 is in contact with the releasing agent layer 11. The releasing agent layer 11 is composed of a material containing substantially no silicone compound. The releasing agent layer 11 is mainly composed of an elastomer and has a Young's modulus of 1.5 GPa or less. Preferred examples of the elastomer include polybutadiene rubber (especially, 1,4-polybutadiene rubber), polyisoprene rubber, and ethylene propylene rubber. The release sheet 1 has excellent releasability and has little adverse effect on electric components and the like.

8 Claims, 2 Drawing Sheets

RELEASE SHEET AND PRESSURE-SENSITIVE ADHESIVE ARTICLE

This application claims priority under 35 U.S.C. §119 to Japanese Patent Application Nos. JP2005-081745 filed Mar. 22, 2005, and JP2006-012373 filed Jan. 20, 2006, the entire content of which is hereby incorporated by reference.

FIELD OF INVENTION

The present invention relates to a release sheet and a pressure-sensitive adhesive article.

DESCRIPTION OF PRIOR ART

Electric components such as relays, various switches, connectors, motors, and hard disks are widely used in various products.

In these electric components, pressure-sensitive adhesive sheets are attached for various purposes such as temporary fixation of parts during assembly and indication of the contents.

Such a pressure-sensitive adhesive sheet is generally constituted from a pressure-sensitive adhesive sheet base and a pressure-sensitive adhesive layer, and is being adhered to a release sheet until it is attached to an electric component.

On the surface of the release sheet (that is, on the surface to be attached to the pressure-sensitive adhesive layer), a releasing agent layer is provided for the purpose of improving releasability. Conventionally, a silicone resin has been used as a material of the releasing agent layer (see, for example, Japanese Patent Laid-open No. H06-336574).

However, it is known that when such a release sheet is attached to the pressure-sensitive adhesive sheet, a silicone compound such as a low-molecular weight silicone resin, siloxane, or silicone oil contained in the release sheet is migrated to the pressure-sensitive adhesive layer of the pressure-sensitive adhesive sheet. Further, normally, the release sheet is wound up in a rolled form after the production thereof, and in this state, the back surface of the release sheet is in contact with the releasing agent layer thereof, so that the silicone compound contained in the releasing agent layer is migrated to the back surface of the release sheet. When a pressure-sensitive adhesive article is manufactured using such a release sheet, the pressure-sensitive adhesive article is also wound up in a rolled form. In connection with this, it is also known that the silicone compound migrated to the back surface of the release sheet is consequently migrated to the surface of a pressure-sensitive adhesive sheet when winding up the pressure-sensitive adhesive article in a rolled form. Therefore, in a case where the pressure-sensitive adhesive sheet to which such a release sheet has been adhered is attached to an electric component, the silicone compound which has been migrated to the pressure-sensitive adhesive layer or the surface of the pressure-sensitive adhesive sheet gradually gasifies. It is known that such a gasified silicone compound is deposited on the surface of an electric contact portion of the electric component due to, for example, electric arc or the like generated near the electric contact portion so that a fine silicone compound layer is formed.

If a silicone compound is deposited on the surface of an electric contact portion, there is a case where conductivity becomes poor.

Particularly, in a case where such a pressure-sensitive adhesive sheet is attached to a hard disk drive, the silicone compound which has been migrated to the pressure-sensitive adhesive layer or the surface of the pressure-sensitive adhesive sheet gradually gasifies, and then the gasified silicone compound is deposited on a magnetic head, a disk surface, etc. Further, there is a possibility that deposition of a fine silicone compound has adverse effects on reading and writing of data.

In order to solve such a problem, attempts to develop a non-silicone based releasing agent containing no silicone compound have been made (see, for example, Japanese Patent Laid-open No. 2004-162048).

However, a release sheet using such a non-silicone based releasing agent has poor releasability, and the performance of such a release sheet is not sufficient.

SUMMARY OF THE INVENTION

It is therefore an object of the present invention to provide a release sheet which has excellent releasability and has little adverse effect on electric components and the like, and a pressure-sensitive adhesive article having such a release sheet.

In order to achieve the above object, the present invention is directed to a release sheet comprising a base material and a releasing agent layer provided on the base material, wherein the releasing agent layer contains substantially no silicone compound, and is mainly composed of an elastomer, and has a Young's modulus of 1.5 GPa or less.

In the present invention, it is preferred that the releasing agent layer is mainly composed of at least one elastomer selected from the group consisting of polybutadiene rubber, polyisoprene rubber, and ethylene propylene rubber. This makes it possible to obtain a release sheet which has a further improved releasability.

Further, it is also preferred that the average thickness of the releasing agent layer is in the range of 0.01 to 1.0 μm. This makes it possible to allow the release sheet to have sufficient releasability and to prevent the occurrence of blocking between the releasing agent layer and the back surface of the release sheet when the release sheet is wound up in a rolled form.

Furthermore, it is also preferred that the release sheet further comprises a primer layer provided between the releasing agent layer and the base material. This makes it possible to improve adhesiveness between the releasing agent layer and the base material.

In this case, the Young's modulus of the primer layer is preferably 1.5 GPa or less. This makes it possible to further improve the releasability of the release sheet while maintaining adhesiveness between the releasing agent layer and the base material.

Further, it is also preferred that the average thickness of the primer layer is in the range of 0.02 to 10.0 μm. This makes it possible to sufficiently obtain the effect of improving releasability and to prevent the occurrence of blocking between a back surface of a web of a release sheet having a primer layer and the primer layer thereof when the web is wound up in a rolled form.

Furthermore, it is also preferred that the Young's modulus of the primer layer is lower than that of the base material. This makes it possible to further improve the releasability of the release sheet.

Another aspect of the present invention is directed to a pressure-sensitive adhesive article comprising the release sheet described above and a pressure-sensitive adhesive sheet having a pressure-sensitive adhesive layer.

DETAILED DESCRIPTION OF THE PREFERRED EMBODIMENTS

Hereinbelow, the present invention will be described in detail with reference to preferred embodiments.

Figure 1:
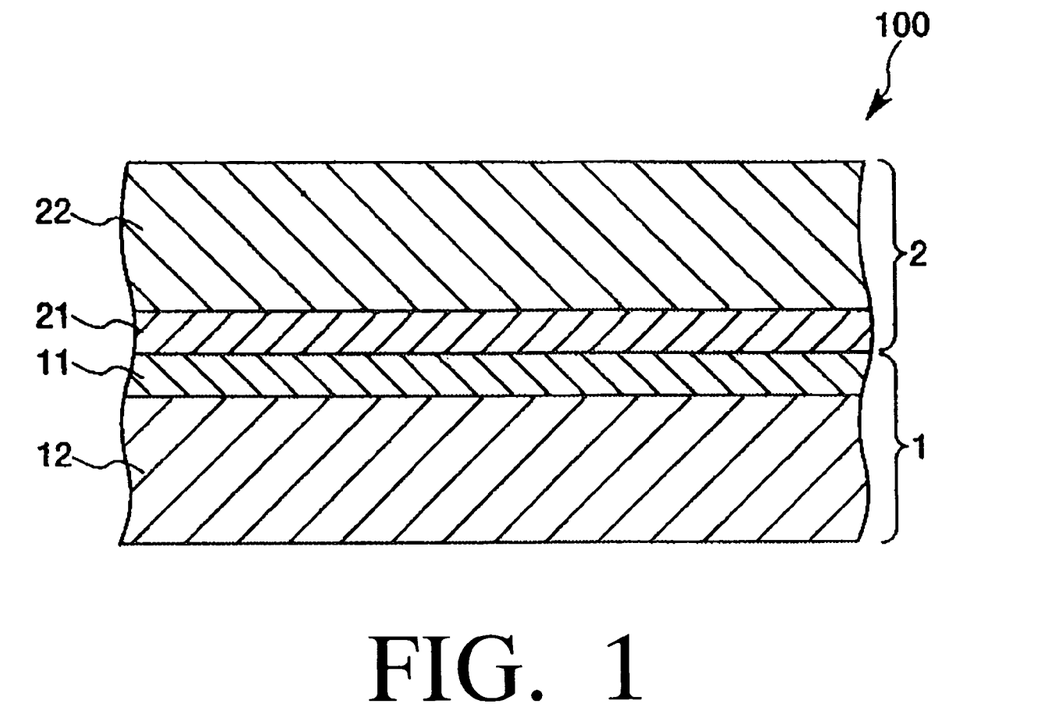
FIG. 1 is a cross-sectional view of a pressure-sensitive adhesive article according to the present invention.
Figure 2:
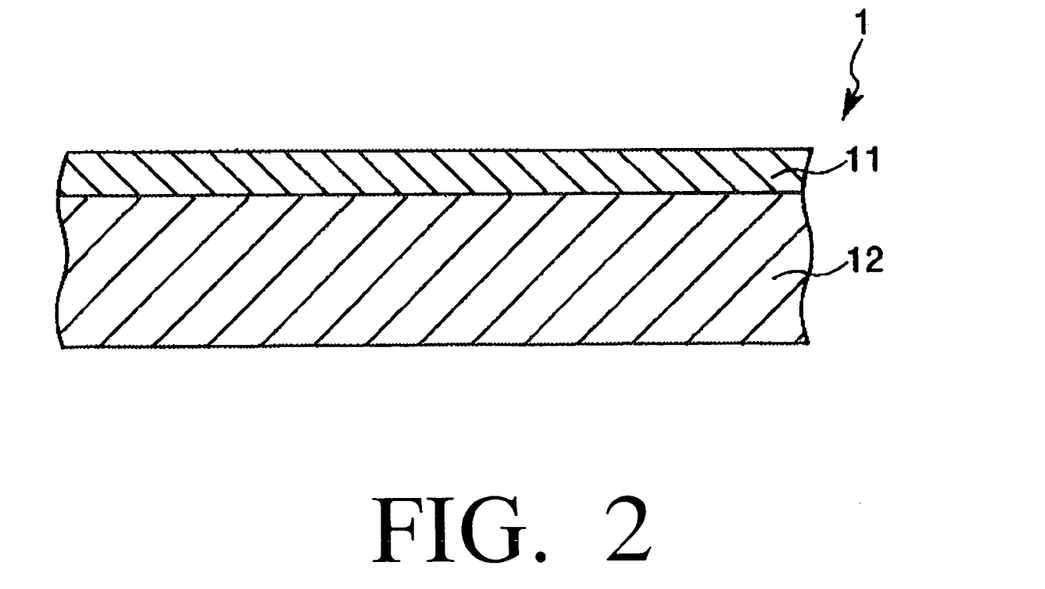
FIG. 2 is a cross-sectional view of a first embodiment of a release sheet according to the present invention.

FIG. 1 is a cross-sectional view of a pressure-sensitive adhesive article according to the present invention, and FIG. 2 is a cross-sectional view of a first embodiment of a release sheet according to the present invention. It is to be noted that in the following description, the upper side and the lower side in FIG. 2 will be referred to as "upper side" and "lower side", respectively.

As shown in FIG. 1, a pressure-sensitive adhesive article 100 (that is, a pressure-sensitive adhesive article according to the present invention) comprises a release sheet 1 and a pressure-sensitive adhesive sheet 2. The release sheet 1 is constituted from a releasing agent layer 11 and a base material (hereinafter, also referred to as a "release sheet base") 12, and the pressure-sensitive adhesive sheet 2 is constituted from a pressure-sensitive adhesive layer 21 and a pressure-sensitive adhesive sheet base 22. Such a pressure-sensitive adhesive article 100 has a structure in which the pressure-sensitive adhesive sheet 2 is laminated on the release sheet 1 so that the pressure-sensitive adhesive layer 21 is in contact with the releasing agent layer 11.

The pressure-sensitive adhesive sheet 2 can be peeled off from the release sheet 1. The pressure-sensitive adhesive sheet 2 is attached to an adherend after it is peeled off from the release sheet 1.

Hereinbelow, a first embodiment of a release sheet according to the present invention will be described.

As shown in FIG. 2, a release sheet 1 has a structure in which a releasing agent layer 11 is provided on a base material 12.

The base material 12 has the function of supporting the releasing agent layer, and is constituted from, for example, a plastic film such as a polyester film (e.g., a polyethylene terephthalate film, a polybutylene terephthalate film), a polyolefin film (e.g., a polypropylene film, a polymethyl pentene film) or a polycarbonate film; a metal foil made of aluminum or stainless steel; paper such as glassine paper, wood-free paper, coated paper, impregnated paper or synthetic paper; or a laminated body of such paper and a thermoplastic resin such as polyethylene.

The average thickness of the base material is not particularly limited, but is preferably in the range of 5 to 300 μm, more preferably in the range of 10 to 200 μm.

By providing the releasing agent layer 11 on the base material 12, it is possible to peel off the pressure-sensitive adhesive sheet 2 from the release sheet 1.

The releasing agent layer 11 is composed of a material containing substantially no silicone compound. This makes it possible to prevent a phenomenon in which a silicone compound is migrated from the release sheet to the pressure-sensitive adhesive layer. Therefore, it is also possible to prevent a phenomenon in which a silicone compound is discharged from the pressure-sensitive adhesive sheet after the pressure-sensitive adhesive sheet is attached to an adherend. For this reason, the pressure-sensitive adhesive sheet has little adverse effect on an adherend, even in a case where the adherend is electronic equipment such as relays.

It is to be noted that a material containing substantially no silicone compound is preferably a material containing a silicone compound in an amount of 500 μg/m$^2$ or less, more preferably a material containing a silicone compound in an amount of 100 μg/m$^2$ or less.

Further, another feature of the release sheet according to the present invention is that the releasing agent layer is mainly composed of an elastomer and has a Young's modulus of 1.5 GPa or less. Namely, the present invention intends to improve the releasability of the release sheet by not only using an elastomer as a constituent material of the releasing agent layer but also controlling the Young's modulus of the releasing agent layer. By doing so, it is possible to allow the release sheet to have excellent releasability. If the Young's modulus of the releasing agent layer is too high, it is impossible for the release sheet to have sufficient releasability. In addition, there is also a case where delamination occurs between the base material and the releasing agent layer when the pressure-sensitive adhesive sheet is peeled off from the release sheet. On the other hand, if the Young's modulus of the releasing agent layer is too low, there is a case where the release sheet cannot have sufficient durability.

As described above, the Young's modulus of the releasing agent layer of the release sheet according to the present invention is 1.5 GPa or less, but is preferably in the range of 0.05 to 1.5 GPa, more preferably in the range of 0.1 to 1.2 GPa. By setting the Young's modulus of the releasing agent layer to a value within the above range, it is possible for the release sheet to have not only excellent releasability but also particularly excellent durability.

Namely, the release sheet according to the present invention simultaneously satisfies the following two conditions: the releasing agent layer contains substantially no silicone compound; and the releasing agent layer is mainly composed of an elastomer and has a Young's modulus of 1.5 GPa or less. Such a release sheet simultaneously satisfying these conditions has excellent releasability and has little adverse effect on electric components such as relays, various switches, connectors, motors, and hard disks.

Such effects cannot be obtained by only satisfying any one of these two conditions.

An elastomer constituting the releasing agent layer 11 is not particularly limited, as long as it is possible to adjust the Young's modulus of the releasing agent layer to 1.5 GPa or less. Examples of such an elastomer include natural rubber, polybutadiene rubber, polyisoprene rubber, butyl rubber, ethylene propylene rubber, and fluoro-rubber. Among these elastomers, at least one elastomer selected from the group consisting of polybutadiene rubber (especially, 1,4-polybutadiene rubber), polyisoprene rubber, and ethylene propylene rubber is particularly preferred. By using such an elastomer, it is possible to obtain a release sheet which has a further improved releasability and which has little adverse effect on electric components such as relays, various switches, connectors, and motors. In addition, it is also possible to relatively easily adjust the Young's modulus of the releasing agent layer when the release sheet is produced. The 1,4-polybutadiene rubber to be used for forming the releasing agent layer 11 is composed of only 1,4-linkage except for 1,2-linkage which is inevitably formed by polymerization. Further, the 1,4-polybutadiene rubber may be in either the cis or trans conformation, and those with any cis content can be used. It is to be noted that there is a case where the Young's modulus of the releasing agent layer 11 varies depending on the cis content of the 1,4-polybutadiene rubber when the releasing agent layer 11 is irradiated with active energy rays (which will be described later).

The Young's modulus of the releasing agent layer 11 composed of such an elastomer can be adjusted by, for example, irradiation with active energy rays or heating. Among these methods, irradiation with active energy rays such as ultraviolet rays or electron rays is particularly preferred. By irradiating the releasing agent layer 11 with active energy rays, it is possible to relatively easily adjust the Young's modulus of the releasing agent layer 11. In addition, it is also possible to prevent the degeneration of an elastomer constituting the releasing agent layer 11.

In a case where the Young's modulus of the releasing agent layer 11 is adjusted by irradiation with ultraviolet rays, the dose of ultraviolet irradiation is preferably 1 to 1,600 mJ/cm$^2$, more preferably 10 to 1,500 mJ/cm$^2$. By setting the dose of ultraviolet irradiation to a value within the above range, it is possible to more appropriately adjust the Young's modulus of the releasing agent layer 11.

In a case where the Young's modulus of the releasing agent layer 11 is adjusted by irradiation with electron rays, the dose of electron irradiation is preferably 0.01 to 4.0 Mrad, more preferably 0.1 to 3.0 Mrad. By setting the dose of electron irradiation to a value within the above range, it is possible to more appropriately adjust the Young's modulus of the releasing agent layer 11.

The average thickness of the releasing agent layer 11 is not particularly limited, but is preferably in the range of 0.01 to 1.0 μm, more preferably in the range of 0.02 to 0.7 μm, even more preferably in the range of 0.02 to 0.3 μm. If the average thickness of the releasing agent layer 11 is less than the above lower limit value, there is a case where the releasability of the release sheet 1 is poor when the pressure-sensitive adhesive sheet 2 is peeled off from the release sheet 1. On the other hand, if the average thickness of the releasing agent layer 11 exceeds the above upper limit value, there is a case where blocking is likely to occur between the releasing agent layer 11 and the back surface of the release sheet 1 when the release sheet 1 is wound up in a rolled form, so that the releasability of the releasing agent layer 11 becomes poor.

The releasing agent layer 11 may contain other resin components and various additives such as plasticizers and stabilizers.

Hereinbelow, the pressure-sensitive adhesive sheet will be described. As shown in FIG. 1, the pressure-sensitive adhesive sheet 2 has a structure in which the pressure-sensitive adhesive layer 21 is provided on the pressure-sensitive adhesive sheet base 22.

The pressure-sensitive adhesive sheet base 22 has the function of supporting the pressure-sensitive adhesive layer 21, and is constituted from, for example, a plastic film such as a polyethylene terephthalate film, a polybutylene terephthalate film, a polyethylene film, a polypropylene film, a polymethyl pentene film or a polycarbonate film; a metal foil made of aluminum or stainless steel; paper such as lint-free paper or synthetic paper; or a laminated body of two or more of these materials.

Among these materials, it is particularly preferred that the pressure-sensitive adhesive sheet base 22 is constituted from a plastic film such as a polyester film (e.g., a polyethylene terephthalate film, a polybutylene terephthalate film) or a polypropylene film; or so-called lint-free paper from which less particles are generated (see, for example, JP-B-H06-11959). When the pressure-sensitive adhesive sheet base 22 is constituted from a plastic film or lint-free paper, particles and the like are hard to be generated when processing or using. As a result, such a pressure-sensitive adhesive sheet base has little adverse effect on electronic equipment such as relays. Further, when the pressure-sensitive adhesive sheet base 22 is constituted from a plastic film or lint-free paper, cutting, punching, or the like during the processing of the pressure-sensitive adhesive article becomes easy. In a case where a plastic film is used as the pressure-sensitive adhesive sheet base, it is more preferred that such a plastic film is a polyethylene terephthalate film because it has the advantages that the amount of generation of particles is low and the amount of generation of gas when heating is also low.

The average thickness of the pressure-sensitive adhesive sheet base 22 is not particularly limited, but is preferably in the range of 5 to 300 μm, more preferably in the range of 10 to 200 μm.

Printing or typing may be made to the surface of the pressure-sensitive adhesive sheet base 22 (that is, to the surface opposite to the surface on which the pressure-sensitive adhesive layer is laminated). Further, surface treatment may be made to the surface of the pressure-sensitive adhesive sheet base 22 for the purpose of, for example, improving adhesion of printing or typing. Furthermore, the pressure-sensitive adhesive sheet 2 may be used as a label.

The pressure sensitive adhesive layer 21 is composed of a pressure-sensitive adhesive composition containing a pressure-sensitive adhesive as a main ingredient. Examples of the pressure-sensitive adhesive include acrylic pressure-sensitive adhesives, polyester-based pressure-sensitive adhesives, and urethane-based pressure-sensitive adhesives.

For example, in a case where an acrylic pressure-sensitive adhesive is used as the pressure-sensitive adhesive, such a pressure-sensitive adhesive can be made of a polymer or a copolymer mainly containing a main monomer component for imparting tackiness, a comonomer component for imparting adhesiveness or cohesive strength, and a functional group-containing monomer component for improving crosslinking sites or adhesiveness.

Examples of the main monomer component include: acrylic alkyl esters such as ethyl acrylate, butyl acrylate, amyl acrylate, 2-ethylhexyl acrylate, octyl acrylate, cyclohexyl acrylate, benzyl acrylate, and methoxyethyl acrylate; and methacrylic alkyl esters such as butyl methacrylate, 2-ethylhexyl methacrylate, cyclohexyl methacrylate, and benzyl methacrylate.

Examples of the comonomer component include methyl acrylate, methyl methacrylate, ethyl methacrylate, vinyl acetate, styrene, and acrylonitrile.

Examples of the functional group-containing monomer component include: carboxyl group-containing monomers such as acrylic acid, methacrylic acid, maleic acid, and itaconic acid; hydroxyl group-containing monomers such as 2-hydroxyethyl acrylate, hydroxyethyl methacrylate, 2-hydroxypropyl acrylate, 2-hydroxypropyl methacrylate, and N-methylol acrylamide; acrylamide; metacrylamide; and glycidyl methacrylate.

By containing these components, adhesive strength and cohesive strength of the pressure-sensitive adhesive composition are improved. Generally, such an acrylic resin has no unsaturated bond in its molecule, and therefore the pressure-sensitive adhesive composition containing the acrylic resin has an improved stability to light or oxygen. Further, by appropriately selecting the kind of monomer or the molecular weight of the pressure-sensitive adhesive, it is possible to obtain a pressure-sensitive adhesive composition having quality and properties suitable for its purpose of use.

The pressure-sensitive adhesive composition may be either of a crosslinked type to which crosslinking treatment has been applied, or a non-crosslinked type to which crosslinking treatment has not been applied. However, the crosslinked type is preferably used. By using the crosslinked type pressure-sensitive adhesive composition, it is possible to form a pressure-sensitive adhesive layer 21 having excellent cohesive strength.

Examples of a crosslinking agent to be used for the crosslinked-type pressure-sensitive adhesive composition include epoxy-based compounds, isocyanate compounds, metal chelate compounds, metal alkoxides, metal salts, amine compounds, hydrazine compounds, and aldehyde compounds.

If necessary, the pressure-sensitive adhesive composition to be used in the present invention may contain various additives such as plasticizers, tackifiers, and stabilizers.

The average thickness of the pressure-sensitive adhesive layer 21 is not particularly limited, but is preferably in the range of 5 to 200 µm, more preferably in the range of 10 to 100 µm.

A release sheet 1 can be produced by preparing the base material 12, and then applying a releasing agent onto the base material 12 to form the releasing agent layer 11.

Examples of a method for applying a releasing agent onto a base material 12 include conventional methods such as gravure coating, bar coating, spray coating, spin coating, knife coating, roll coating, and die coating.

A pressure-sensitive adhesive sheet 2 can be produced by preparing a pressure-sensitive adhesive sheet base 22, and then applying a pressure-sensitive adhesive composition onto the pressure-sensitive adhesive sheet base 22 to form the pressure-sensitive adhesive layer 21.

Examples of a method for applying a pressure-sensitive adhesive composition onto a pressure-sensitive adhesive sheet base 22 include conventional methods such as gravure coating, bar coating, spray coating, spin coating, knife coating, roll coating, and die coating.

In this case, the pressure-sensitive adhesive composition may be of a solvent type, an emulsion type, a hot melt type, or the like.

Thereafter, the pressure-sensitive adhesive sheet 2 is laminated on the release sheet 1 so that the pressure-sensitive adhesive layer 21 is in contact with the releasing agent layer 11, thereby enabling a pressure-sensitive adhesive article 100 to be obtained.

According to such a manufacturing method, a pressure-sensitive adhesive article 100 can be manufactured without exposing the release sheet 1 to high temperature in the course of manufacture. Further, the releasing agent layer 11 is hard to receive influence of, for example, a solvent used in forming the pressure-sensitive adhesive layer 21.

Alternatively, a pressure-sensitive adhesive article 100 may be manufactured by forming a pressure-sensitive adhesive layer 21 on the releasing agent layer 11 of the release sheet 1, and then laminating a pressure-sensitive adhesive sheet base 22 on the pressure-sensitive adhesive layer 21.

Hereinbelow, a second embodiment of the release sheet according to the present invention will be described. In the following, the release sheet of the second embodiment will be explained by focusing the difference between the first and second embodiments, and explanation for the overlapping points is omitted.

Figure 3:
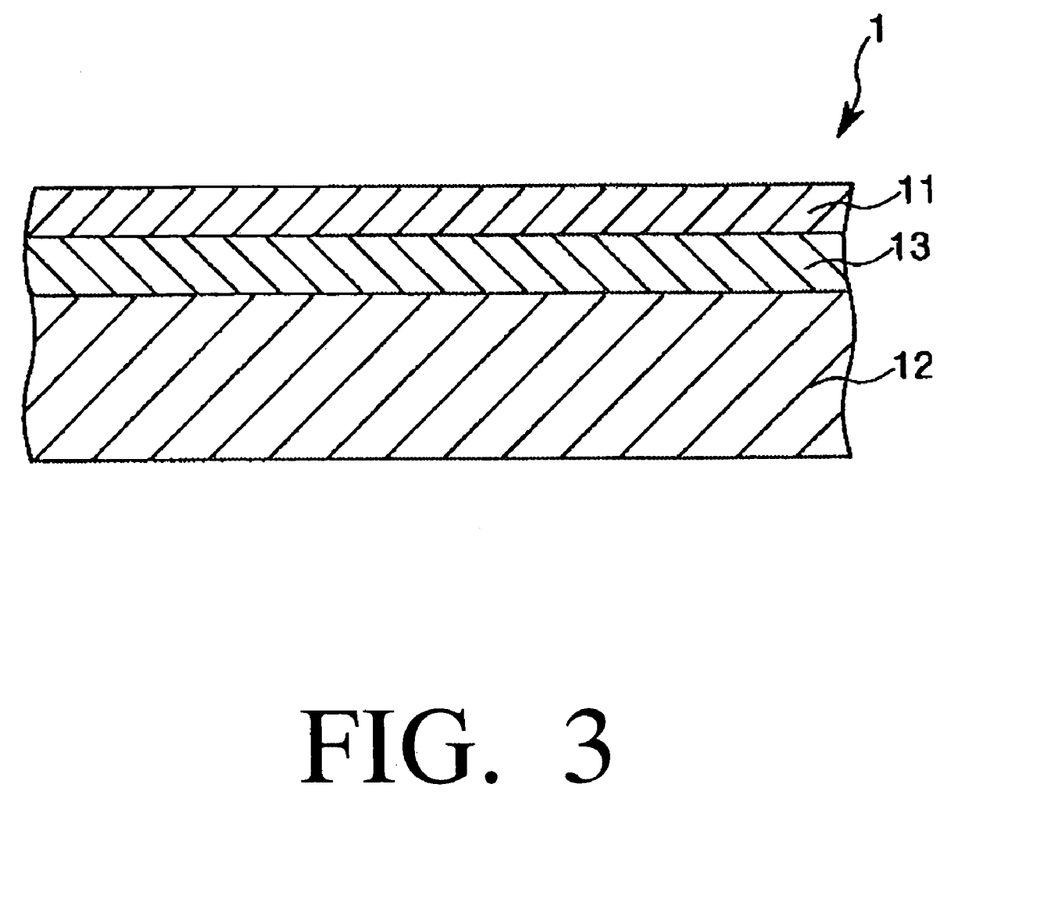
FIG. 3 is a cross-sectional view of a second embodiment of the release sheet according to the present invention.

FIG. 3 is a cross-sectional view of the second embodiment of the release sheet according to the present invention. As shown in FIG. 3, a release sheet 1 has a structure in which a releasing agent layer 11 is provided on a base material 12 through a primer layer 13 provided as an intermediate layer.

By providing such a primer layer 13, it is possible to improve adhesiveness between the releasing agent layer 11 and the base material 12, thereby properly preventing the occurrence of delamination at the boundary between the releasing agent layer 11 and the base material 12 when the release sheet 1 is peeled off from the pressure-sensitive adhesive sheet 2. In addition, it is also possible to properly prevent part of the releasing agent layer from adhering to or remaining on the pressure-sensitive adhesive layer after the release sheet 1 is peeled off from the pressure-sensitive adhesive sheet 2.

The Young's modulus of the primer layer 13 is preferably 1.5 GPa or less, more preferably 0.05 to 1.5 GPa, even more preferably 0.1 to 1.2 GPa. By setting the Young's modulus of the primer layer 13 to a value within the above range, it is possible to further improve the releasability of the release sheet 1 while maintaining adhesiveness between the releasing agent layer 11 and the base material 12. Particularly, it is possible to improve the releasability of the release sheet 1 even in a case where the average thickness of the releasing agent layer 11 is relatively small. In addition, it is also possible to effectively prevent lowering of the releasability of the release sheet 1 due to heating or time degradation. On the other hand, if the Young's modulus of the primer layer 13 is too high, there is a case where the effect of improving releasability cannot be satisfactorily obtained even when the primer layer 13 is provided.

It is preferred that the Young's modulus of the primer layer 13 is lower than that of the base material 12. That is, it is preferred that the primer layer 13 is more flexible than the base material 12, which makes it possible to further improve the releasability of the release sheet 1.

Examples of a constituent material of the primer layer 13 include natural rubber, synthetic rubber, polyethylene resins, polyester resins, vinyl chloride resins, and polyurethane resins. Among these materials, in a case where a polyurethane resin is used, adhesiveness between the releasing agent layer 11 and the base material 12 is improved, and an obtained release sheet 1 can exhibit more excellent releasability. Particularly, in a case where a polyurethane resin is used as a constituent material of the primer layer 13 and 1,4-polybutadiene rubber is used as a constituent material of the releasing agent layer 11, the effects of the present invention become more conspicuous.

The average thickness of the primer layer 13 is not particularly limited, but is preferably in the range of 0.02 to 10.0 µm, more preferably in the range of 0.03 to 10.0 µm, even more preferably in the range of 0.05 to 5.0 µm. If the average thickness of the primer layer 13 is less than the above lower limit value, there is a case where the effect of improving the releasability of the release sheet 1 cannot be satisfactorily obtained even when the primer layer 13 is provided. On the other hand, if the average thickness of the primer layer 13 exceeds the above upper limit value, blocking is likely to occur between the back surface of a web of a release sheet having a primer layer 13 (that is, a release sheet not having a releasing agent layer 11) and the primer layer 13 thereof when the web is wound up in a rolled form.

In this embodiment, the primer layer 13 may have purposes other than the above-mentioned purposes. For example, the primer layer 13 may be a barrier layer that prevents migration of the components between the releasing agent layer 11 and the base material 12. Further, the release sheet 1 may have two or more primer layers 13. In a case where the release sheet 1 has two or more primer layers 13, the primer layers 13 may be provided so that their respective values of Young's modulus are gradually increased from the releasing agent layer 11 side toward the base material 12 side. That is, the primer layers 13 may be provided so as to become gradually more flexible from the base material 12 side toward the releasing agent layer 11 side. By doing so, it is possible to effectively prevent lowering of the releasability of the release sheet 1 due to heating or time degradation so that the release sheet 1 has more excellent releasability.

Although the release sheet and the pressure-sensitive adhesive article according to the present invention have been described with reference to the preferred embodiments thereof, the present invention is not limited thereto. For example, the pressure-sensitive adhesive article of the present invention may have a structure such that two pressure-sensitive adhesive layers are formed on both sides of a pressure sensitive adhesive sheet base, and release sheets are respectively attached to each of the pressure-sensitive adhesive layers.

Further, although the release sheet of the above embodiment is constituted from a releasing agent layer and a base material, the release sheet of the present invention may be, for example, a resin film that combines a releasing agent layer and a base material.

Furthermore, although the pressure-sensitive adhesive article of the above embodiment has a structure such that a pressure-sensitive adhesive sheet is laminated on a release sheet, the pressure-sensitive adhesive article of the present invention may have a structure such that a releasing agent layer is formed on one surface of a base material and a pressure-sensitive adhesive layer is formed on the other surface of the base material.

Moreover, the practical application of the release sheet and the pressure-sensitive adhesive article of the present invention is not limited to the above-mentioned electric components such as relays, various switches, connectors, motors, and hard disks.

EXAMPLES

Hereinbelow, actual examples of the release sheet of the present invention will be described.

1. Production of Release Sheet

Example 1

(1) Formation of Primer Layer

First, 100 parts by weight of a polyurethane resin (manufactured by DAINIPPON INK AND CHEMICALS, INC. under the trade name of "CRISVON 5150S", concentration: 50%) and 5 parts by weight of an isocyanate-based curing agent (manufactured by DAINIPPON INK AND CHEMICALS, INC. under the trade name of "CRISVON NX") were diluted with methyl ethyl ketone to prepare a primer liquid having a solid concentration of 2 wt %.

Next, the primer liquid was applied onto a polyethylene terephthalate (PET) film having an average thickness of 38 µm (manufactured by MITSUBISHI POLYESTER FILM CORPORATION under the trade name of "PET38T-100", Young's modulus: 3.38 GPa) with a mayer bar #4, and was then dried by heating at 130° C. for 60 seconds to form a primer layer having an average thickness of 0.14 µm on the base material.

(2) Formation of Releasing Agent Layer

First, 1,4-polybutadiene rubber (manufactured by ZEON CORPORATION under the trade name of "Nipol 1241", cis-1,4 linkage content: 35%) was diluted with toluene to prepare a dispersion liquid having a solid concentration of 0.5 wt %. Then, an antioxidant (manufactured by Ciba Specialty Chemicals under the trade name of "Irganox HP2251") was added to the dispersion liquid at a ratio of one part by weight with respect to 100 parts by weight of the 1,4-polybutadiene rubber contained in the dispersion liquid to prepare a releasing agent liquid.

The thus prepared releasing agent liquid was applied onto the primer layer with a mayer bar #4, and was then dried by heating at 100° C. for 60 seconds. Then, the layer provided on the primer layer was irradiated with ultraviolet rays at 110 mJ/cm$^2$ to form a releasing agent layer having an average thickness of 0.04 µm. In this way, a release sheet was produced.

It is to be noted that the Young's modulus of the primer layer was 0.714 GPa, and the Young's modulus of the releasing agent layer was 0.355 GPa.

Examples 2 to 4

A release sheet was produced in the same manner as in the Example 1 except that the dose of ultraviolet irradiation was changed so that the releasing agent layer had a Young's modulus shown in Table 1.

Example 5

A release sheet was produced in the same manner as in the Example 1 except that the amount of the isocyanate-based curing agent for forming a primer layer was changed to 25 parts by weight with respect to 100 parts by weight of the polyurethane resin and that the dose of ultraviolet irradiation was changed as shown in Table 1 when a releasing agent layer was formed.

Example 6

A release sheet was produced in the same manner as in the Example 1 except that ultraviolet irradiation was omitted.

Example 7

A release sheet was produced in the same manner as in the Example 1 except that the 1,4-polybutadiene rubber was replaced with ethylene propylene rubber (manufactured by Mitsui Chemicals, Inc. under the trade name of "TAFMER P0275G") to prepare a releasing agent liquid.

Example 8

A release sheet was produced in the same manner as in the Example 1 except that the primer liquid was applied onto the base material so that the average thickness of the primer layer was 0.6 µm.

Example 9

A release sheet was prepared in the same manner as in the Example 1 except that the polyurethane resin was replaced with a polyethylene resin (manufactured by Japan Polyolefins Co., Ltd under the trade name of "J-Rex H807A") to prepare a primer liquid and that the primer liquid was applied onto the base material so that the average thickness of the primer layer was 5.0 µm.

Examples 10 to 13

A release sheet was produced in the same manner as in the Example 1 except that the average thickness of the releasing agent layer was changed as shown in Table 1.

Example 14

A release sheet was produced in the same manner as in the Example 1 except that the releasing agent liquid was directly applied onto the base material without providing a primer layer and that the average thickness of the releasing agent layer was changed to 0.16 µm.

Example 15

A release sheet was produced in the same manner as in the Example 14 except that the 1,4-polybutadiene rubber was replaced with polyisoprene rubber (manufactured by JSR Corporation under the trade name of "IR2200") to prepare a releasing agent liquid.

Example 16

A release sheet was produced in the same manner as in the Example 14 except that ultraviolet irradiation was omitted.

Example 17

A release sheet was produced in the same manner as in the Example 14 except that the 1,4-polybutadiene rubber was replaced with another 1,4-polybutadiene rubber (manufactured by KANTO CHEMICAL CO., INC. under the trade name of "poly(butadiene) 98% cis") and that the average thickness of the releasing agent layer was changed as shown in Table 1.

Example 18

A release sheet was produced in the same manner as in the Example 14 except that the 1,4-polybutadiene rubber was replaced with 1,4-polybutadiene rubber/polyisoprene rubber (1:1) to prepare a releasing agent liquid. It is to be noted that the 1,4-polybutadiene rubber was one used in the Example 1 and the polyisoprene rubber was one used in the Example 15.

Example 19

(1) Formation of Primer Layer

First, 100 parts by weight of a polyurethane resin (manufactured by DAINIPPON INK AND CHEMICALS, INC. under the trade name of "CRISVON 5150S", concentration: 50%), and 5 parts by weight of an isocyanate-based curing agent (manufactured by DAINIPPON INK AND CHEMICALS, INC. under the trade name of "CRISVON NX") were diluted with methyl ethyl ketone to prepare a primer liquid having a solid concentration of 2 wt %.

Next, the primer liquid was applied onto a polyethylene terephthalate (PET) film having an average thickness of 38 µm (manufactured by MITSUBISHI POLYESTER FILM CORPORATION under the trade name of "PET38T-100", Young's modulus: 3.38 GPa) with a mayer bar #4, and was then dried by heating at 130° C. for 60 seconds to form a primer layer having an average thickness of 0.14 µm on the base material.

(2) Formation of Releasing Agent Layer

First, 1,4-polybutadiene rubber (manufactured by ZEON CORPORATION under the trade name of "Nipol 1241", cis-1,4 linkage content: 35%) was diluted with toluene to prepare a dispersion liquid having a solid concentration of 0.5 wt %. Then, an antioxidant (manufactured by Ciba Specialty Chemicals under the trade name of "Irganox HP2251") was added to the dispersion liquid at a ratio of one part by weight with respect to 100 parts by weight of the 1,4-polybutadiene rubber contained in the dispersion liquid to prepare a releasing agent liquid.

The thus prepared releasing agent liquid was applied onto the primer layer with a mayer bar #4, and was then dried by heating at 100° C. for 60 seconds. Then, the layer provided on the primer layer was irradiated with electron rays at 0.6 Mrad to form a releasing agent layer having an average thickness of 0.04 µm. In this way, a release sheet was produced.

It is to be noted that the Young's modulus of the primer layer was 0.714 GPa, and the Young's modulus of the releasing agent layer was 1.000 GPa.

Example 20

A release sheet was produced in the same manner as in the Example 19 except that the 1,4-polybutadiene rubber was replaced with another 1,4-polybutadiene rubber (manufactured by KANTO CHEMICAL CO., INC. under the trade name of "poly(butadiene) 98% cis", cis-1,4 linkage content: 98%).

Example 21

A release sheet was produced in the same manner as in the Example 19 except that the 1,4-polybutadiene rubber was replaced with ethylene propylene rubber (manufactured by Mitsui Chemicals under the trade name of "TAFMER P0275G") to prepare a releasing agent liquid.

Example 22

A release sheet was produced in the same manner as in the Example 19 except that the 1,4-polybutadiene rubber was replaced with polyisoprene rubber (manufactured by JSR Corporation under the trade name of "IR2200") to prepare a releasing agent liquid.

Example 23

A release sheet was produced in the same manner as in the Example 19 except that the 1,4-polybutadiene rubber was replaced with ethylene propylene rubber (manufactured by Mitsui Chemicals under the trade name of "TAFMER P0275G") to prepare a releasing agent liquid and that the dose of electron irradiation was changed so that the releasing agent layer had a Young's modulus shown in Table 2.

Example 24

A release sheet was produced in the same manner as in the Example 19 except that the 1,4-polybutadiene rubber was replaced with 1,4-polybutadiene rubber/polyisoprene rubber (1:1) to prepare a releasing agent liquid. It is to be noted that the 1,4-polybutadiene rubber was one used in the Example 19 and the polyisoprene rubber was one used in the Example 22.

Example 25

A release sheet was produced in the same manner as in the Example 19 except that the releasing agent liquid was directly applied onto the base material without providing a primer layer to form a releasing agent layer having an average thickness of 0.04 µm.

Examples 26 and 27

A release sheet was produced in the same manner as in the Example 25 except that the 1,4-polybutadiene rubber was replaced with another 1,4-polybutadiene rubber (manufactured by KANTO CHEMICAL CO., INC. under the trade name of "poly(butadiene) 98% cis", cis-1,4 linkage content: 98%) and that the average thickness of the releasing agent layer was changed as shown in Table 2.

Example 28

A release sheet was produced in the same manner as in the Example 25 except that the 1,4-polybutadiene rubber was replaced with ethylene propylene rubber (manufactured by Mitsui Chemicals under the trade name of "TAFMER P0275G") to prepare a releasing agent liquid.

Example 29

A release sheet was produced in the same manner as in the Example 25 except that the 1,4-polybutadiene rubber was replaced with polyisoprene rubber (manufactured by JSR Corporation under the trade name of "IR2200") to prepare a releasing agent liquid.

Example 30

A release sheet was produced in the same manner as in the Example 25 except that the 1,4-polybutadiene rubber was changed to ethylene propylene rubber (manufactured by Mitsui Chemicals under the trade name of "TAFMER P0275G") and that the dose of electron irradiation was changed so that the releasing agent layer had a Young's modulus shown in Table 2.

Example 31

A release sheet was produced in the same manner as in the Example 25 except that the 1,4-polybutadiene rubber was replaced with 1,4-polybutadiene rubber/polyisoprene rubber (1:1) to prepare a releasing agent liquid. It is to be noted that the 1,4-polybutadiene rubber was one used in the Example 19 and the polyisoprene rubber was one used in the Example 22.

Comparative Example 1

A release sheet was produced in the same manner as in the Example 1 except that the dose of ultraviolet irradiation was changed so that the releasing agent layer had a Young's modulus shown in Table 1.

Comparative Example 2

A release sheet was produced in the same manner as in the Example 26 except that the dose of electron irradiation was changed so that the releasing agent layer had a Young's modulus shown in Table 2.

Table 1 and Table 2 show conditions for forming a releasing agent layer and a primer layer of each of the release sheets of the above Examples and Comparative Examples, such as constituent material, Young's modulus, average thickness, dose of ultraviolet irradiation, and dose of electron irradiation. It is to be noted that the Young's modulus of each of the layers was measured using a NanoIndenter (manufactured by MTS Corporation and equipped with TestWorks 4) at a depth of 0.02 μm in a thickness direction of the layer.

TABLE 1

| | Primer Layer | | | Releasing Agent Layer | | | |
| | | | | | Dose of | | |
| | Constituent Material | Young's Modulus [GPa] | Average Thickness [μm] | Constituent Material | Ultraviolet Irradiation [mj/cm$^2$] | Young's Modulus [GPa] | Average Thickness [μm] |
| --- | --- | --- | --- | --- | --- | --- | --- |
| EX. 1 | polyurethane | 0.714 | 0.14 | 1,4-polybutadiene rubber | 110 | 0.355 | 0.04 |
| EX. 2 | polyurethane | 0.714 | 0.14 | 1,4-polybutadiene rubber | 220 | 0.398 | 0.04 |
| EX. 3 | polyurethane | 0.714 | 0.14 | 1,4-polybutadiene rubber | 880 | 1.100 | 0.04 |
| EX. 4 | polyurethane | 0.714 | 0.14 | 1,4-polybutadiene rubber | 1320 | 1.410 | 0.04 |
| EX. 5 | polyurethane | 0.980 | 0.14 | 1,4-polybutadiene rubber | 440 | 0.602 | 0.04 |
| EX. 6 | polyurethane | 0.714 | 0.14 | 1,4-polybutadiene rubber | 0 | 0.070 | 0.04 |
| EX. 7 | polyurethane | 0.714 | 0.14 | ethylene propylene rubber | 110 | 0.150 | 0.04 |
| EX. 8 | polyurethane | 0.698 | 0.6 | 1,4-polybutadiene rubber | 110 | 0.388 | 0.04 |
| EX. 9 | polyurethane | 0.820 | 5.0 | 1,4-polybutadiene rubber | 110 | 0.378 | 0.04 |
| EX. 10 | polyurethane | 0.714 | 0.14 | 1,4-polybutadiene rubber | 110 | 0.370 | 0.12 |
| EX. 11 | polyurethane | 0.714 | 0.14 | 1,4-polybutadiene rubber | 110 | 0.340 | 0.25 |
| EX. 12 | polyurethane | 0.714 | 0.14 | 1,4-polybutadiene rubber | 110 | 0.320 | 0.5 |
| EX. 13 | polyurethane | 0.714 | 0.14 | 1,4-polybutadiene rubber | 110 | 0.318 | 0.70 |
| EX. 14 | — | — | — | 1,4-polybutadiene rubber | 110 | 0.230 | 0.16 |
| EX. 15 | — | — | — | polyisoprene rubber | 110 | 0.210 | 0.16 |
| EX. 16 | — | — | — | 1,4-polybutadiene rubber | 0 | 0.08 | 0.16 |
| EX. 17 | — | — | — | 1,4-polybutadiene rubber | 110 | 0.300 | 0.04 |
| EX. 18 | — | — | — | 1,4-polybutadiene rubber/ polyisoprene rubber | 110 | 0.220 | 0.16 |
| Com. Ex. 1 | polyurethane | 0.714 | 0.14 | 1,4-polybutadiene rubber | 2200 | 2.000 | 0.04 |

TABLE 2

| | Primer Layer | | | Releasing Agent Layer | | | |
| --- | --- | --- | --- | --- | --- | --- | --- |
| | Constituent Material | Young's Modulus [GPa] | Average Thickness [μm] | Constituent Material | Dose of Electron Irradiation [Mrad] | Young's Modulus [GPa] | Average Thickness [μm] |
| EX. 19 | polyurethane | 0.714 | 0.14 | 1,4-polybutadiene rubber | 0.6 | 1.000 | 0.04 |
| EX. 20 | polyurethane | 0.714 | 0.14 | 1,4-polybutadiene rubber | 0.6 | 0.350 | 0.04 |
| EX. 21 | polyurethane | 0.714 | 0.14 | ethylene propylene rubber | 0.6 | 0.500 | 0.04 |
| EX. 22 | polyurethane | 0.714 | 0.14 | polyisoprene rubber | 0.6 | 0.930 | 0.04 |
| EX. 23 | polyurethane | 0.714 | 0.14 | ethylene propylene rubber | 1.7 | 0.900 | 0.04 |
| EX. 24 | polyurethane | 0.714 | 0.14 | 1,4-polybutadiene rubber/ polyisoprene rubber | 0.6 | 0.650 | 0.04 |
| EX. 25 | — | — | — | 1,4-polybutadiene rubber | 0.6 | 1.200 | 0.04 |
| EX. 26 | — | — | — | 1,4-polybutadiene rubber | 0.6 | 0.730 | 0.04 |
| EX. 27 | — | — | — | 1,4-polybutadiene rubber | 0.6 | 0.730 | 0.12 |
| EX. 28 | — | — | — | ethylene propylene rubber | 0.6 | 0.710 | 0.04 |
| EX. 29 | — | — | — | polyisoprene rubber | 0.6 | 1.020 | 0.04 |
| EX. 30 | — | — | — | ethylene propylene rubber | 1.7 | 0.960 | 0.04 |
| EX. 31 | — | — | — | 1,4-polybutadiene rubber/ polyisoprene rubber | 0.6 | 0.800 | 0.04 |
| Com. Ex. 2 | — | — | — | 1,4-polybutadiene rubber | 5.7 | 2.500 | 0.04 |

2. Production of Pressure-Sensitive Adhesive Article

First, an acrylic pressure-sensitive adhesive (manufactured by Lintec Corporation under the trade name of "NPL") was applied onto a polyethylene terephthalate film (average thickness: 38 μm) with an applicator, and was then dried by heating at 110° C. for 60 seconds to form a pressure-sensitive adhesive layer having a thickness of 25 μm. In this way, a pressure-sensitive adhesive sheet was produced.

Thereafter, the pressure-sensitive adhesive sheet was laminated on each of the release sheets produced in the above Examples and Comparative Examples in such a manner that the releasing agent layer of the release sheet was in contact with the pressure-sensitive adhesive layer of the pressure-sensitive adhesive sheet to obtain a pressure-sensitive adhesive article.

3. Evaluation (Adhesiveness Between Base Material and Releasing Agent Layer)

Adhesiveness between the release sheet base and the releasing agent layer of each of the release sheets obtained in the above Examples and Comparative Examples was determined by a rub-off method and evaluated according to the following three criteria.

A: The releasing agent layer was not rubbed off from the release sheet base (adhesiveness was excellent).
B: The releasing agent layer was slightly rubbed off from the release sheet base, but there was no problem from the viewpoint of practical use.
C: The releasing agent layer was significantly rubbed off from the release sheet base, which was a problem from the viewpoint of practical use.

(Release Strength Test)

Release strength was measured using each of the pressure-sensitive adhesive articles having the release sheets of the above Examples and Comparative Examples, respectively. It is to be noted that the measurement of release strength was carried out using the pressure-sensitive adhesive article which had been left standing for one day at 23° C. and 50% RH and the pressure sensitive adhesive article which had been subjected to aging for 7 days at 40° C.

The measurement of release strength was carried out using a tensile strength tester according to JIS-Z0237. Specifically, the pressure-sensitive adhesive article was cut into a piece of width 25 mm and length 200 mm, and the release sheet of the pressure-sensitive adhesive article was fixed to a test panel. Then, the pressure-sensitive adhesive sheet was peeled off from the release sheet by pulling the pressure-sensitive adhesive sheet base in a 180° direction at a rate of 300 mm/min. The thus measured release strength was evaluated according to the following five criteria.

A: Release strength measured after the lapse of one day and release strength measured after the completion of aging were both less than 500 mN/25 mm (releasability was excellent).
B: Release strength measured after the lapse of one day and release strength measured after the completion of aging were both 500 mN/25 mm or more but less than 750 mN/25 mm (releasability was good).
C: Release strength measured after the lapse of one day and release strength measured after the completion of aging were both 750 mN/25 mm or more but less than 1,000 mN/25 mm, but there was no problem from the viewpoint of practical use.
D: Release strength measured after the lapse of one day was less than 1,000 mN/25 mm, but release strength measured after the completion of aging was 1,000 mN/25 mm or more, which was a problem from the viewpoint of durability.
E: Release strength measured after the lapse of one day was 1,000 mN/25 mm or more, which was a problem from the viewpoint of practical use.

The results are shown in Tables 3 and 4.

TABLE 3

| | Adhesiveness between Base Material and Releasing Agent Layer | Evaluation of Release Strength |
| --- | --- | --- |
| EX. 1 | A | A |
| EX. 2 | A | A |
| EX. 3 | A | A |
| EX. 4 | A | B |
| EX. 5 | A | A |
| EX. 6 | A | B |
| EX. 7 | A | B |
| EX. 8 | A | A |
| EX. 9 | A | A |

TABLE 3-continued

| | Adhesiveness between Base Material and Releasing Agent Layer | Evaluation of Release Strength |
|---|---|---|
| EX. 10 | A | A |
| EX. 11 | A | A |
| EX. 12 | A | B |
| EX. 13 | A | C |
| EX. 14 | B | B |
| EX. 15 | B | C |
| EX. 16 | B | C |
| EX. 17 | B | C |
| EX. 18 | B | B |
| Com. EX. 1 | A | E |

TABLE 4

| | Adhesiveness between Base Material and Releasing Agent Layer | Evaluation of Release Strength |
|---|---|---|
| EX. 19 | A | A |
| EX. 20 | A | A |
| EX. 21 | A | A |
| EX. 22 | A | A |
| EX. 23 | A | B |
| EX. 24 | A | A |
| EX. 25 | B | C |
| EX. 26 | B | A |
| EX. 27 | B | A |
| EX. 28 | B | A |
| EX. 29 | B | B |
| EX. 30 | B | B |
| EX. 31 | B | B |
| Com. EX. 2 | C | E |

As can be seen from Tables 3 and 4, the release strength of each of the release sheets of the Comparative Examples was too high to apply it to practical use. On the other hand, each of the release sheets of the Examples was excellent in releasability. Particularly, in a case where the release sheet having a primer layer was used, lowering of releasability due to heating or time degradation was effectively prevented. Further, the release sheets according to the present invention contain no silicon compound, and therefore they had little adverse effect on electric components such as relays.

Effect of the Invention

According to the present invention, it is possible to obtain a release sheet which has excellent releasability and has little adverse effect on electric components such as relays, various switches, connectors, motors, and hard disks, and a pressure-sensitive adhesive article having such a release sheet.

Particularly, by providing a primer layer having a Young's modulus of 1.5 GPa or less in the release sheet, it is possible for the release sheet to have a further improved releasability.

Finally, it is to be understood that the present invention is not limited to the Embodiments and Examples described above, and many changes or additions may be made without departing from the scope of the invention which is determined by the following claims.

Further, it is to be understood that the present disclosure relates to the subject matters contained in Japanese Patent Applications No. 2005-081745 (filed on Mar. 22, 2005) and No. 2006-012373 (filed on Jan. 20, 2005) which are expressly incorporated herein by reference in their entireties.

The invention claimed is:

1. A release sheet comprising:
   a base material;
   a releasing agent layer provided on the base material, wherein the releasing agent layer contains substantially no silicone compound, and is mainly composed of an antioxidant and at least one elastomer selected from polyisoprene rubber and ethylene propylene rubber, and has a Young's modulus in the range of 0.1 to 1.2 GPa; and,
   a primer layer provided between the releasing agent layer and the base material.

2. The release sheet as claimed in claim 1, wherein the average thickness of the primer layer is in the range of 0.02 to 10.0 μm.

3. The release sheet as claimed in claim 1, wherein the Young's modulus of the primer layer is lower than that of the base material.

4. The release sheet as claimed in claim 1, wherein the releasing agent layer is irradiated with active energy rays so that the at least one elastomer of the releasing agent layer is cured.

5. The release sheet of claim 1 further comprising a pressure-sensitive adhesive sheet having a pressure-sensitive adhesive layer wherein the pressure-sensitive adhesive layer contacts the releasing agent layer.

6. The release sheet as claimed in claim 5, wherein the pressure-sensitive adhesive layer contains at least one adhesive selected from the group comprising acrylic pressure-sensitive adhesives, polyester-based pressure-sensitive adhesives and urethane-based pressure-sensitive adhesives.

7. A release sheet comprising:
   a base material;
   a releasing agent layer provided on the base material, wherein the releasing agent layer contains substantially no silicone compound, and is composed of an antioxidant and at least one elastomer selected from polyisoprene rubber and ethylene propylene rubber, and has a Young's modulus in the range of 0.1 to 1.2 GPa;
   a pressure-sensitive adhesive layer provided on the release agent layer; and a primer layer provided between the releasing agent layer and the base material.

8. The release sheet as claimed in claim 7, wherein the pressure-sensitive adhesive layer contains at least one adhesive selected from the group comprising acrylic pressure-sensitive adhesives, polyester-based pressure-sensitive adhesives and urethane-based pressure-sensitive adhesives.

* * * * *